(12) United States Patent
Cusson et al.

(10) Patent No.: US 6,487,641 B1
(45) Date of Patent: Nov. 26, 2002

(54) DYNAMIC CACHES WITH MISS TABLES

(75) Inventors: Michael J. Cusson, Chelmsford, MA (US); Marcos G. Almeida, Nashua, NH (US); Ramu V. Sunkara, Los Altos, CA (US); Anil J. D'Silva, Nashua, NH (US)

(73) Assignee: Oracle Corporation, Parkwood Shores, CA (US)

( * ) Notice: Subject to any disclaimer, the term of this patent is extended or adjusted under 35 U.S.C. 154(b) by 0 days.

(21) Appl. No.: 09/654,653

(22) Filed: Sep. 5, 2000

Related U.S. Application Data (63) Continuation-in-part of application No. 09/294,656, filed on Apr. 19, 1999.
(60) Provisional application No. 60/168,589, filed on Dec. 2, 1999.

(51) Int. Cl.$^7$ .............................................. G06F 12/00
(52) U.S. Cl. ........................ 711/144; 711/141; 711/118; 709/220
(58) Field of Search ........................ 711/141–144, 118; 707/2, 10, 202; 709/202–203, 220; 712/218

(56) References Cited

U.S. PATENT DOCUMENTS

| | | | |
|---|---|---|---|
| 5,924,096 A | * 7/1999 | Draper et al. | 707/10 |
| 5,940,594 A | * 8/1999 | Ali et al. | 709/203 |
| 6,098,064 A | * 8/2000 | Pirolli et al. | 707/2 |
| 6,128,627 A | * 10/2000 | Mattis et al. | 707/202 |
| 6,148,394 A | * 11/2000 | Tung et al. | 712/218 |
| 6,173,311 B1 | * 1/2001 | Hassett et al. | 709/202 |

* cited by examiner

*Primary Examiner*—Do Hyun Yoo
*Assistant Examiner*—Nasser Moazzami
(74) *Attorney, Agent, or Firm*—Gordon E. Nelson (57) ABSTRACT

A middle-tier Web server with a queryable cache that contains items from one or more data sources. Items are included in the cache on the basis of the probability of future hits on the items. When the data source determines that an item that has been included in the cache has changed, it sends an update message to the server, which updates the item if it is still included in the cache. In a preferred embodiment, the data source is a database system and triggers in the database system are used to generate update messages. In a preferred embodiment, the data access layer determines whether a data item required by an application program is in the cache. If it is, the data access layer obtains the item from the cache; otherwise, it obtains the item from the data source. The queryable cache includes a miss table that accelerates the determination of whether a data item is in the cache. The miss table is made up of miss table entries that relate the status of a data item to the query used to access the data item. There are three statuses: miss, indicating that the item is not in the cache, hit, indicating that it is, and unknown, indicating that it is not known whether the item is in the cache. When an item is referenced, the query used to access it is presented to the table. If the entry for the query has the status miss, the data access layer obtains the item from the data source instead of attempting to obtain it from the cache. If the entry has the status unknown, the data access layer attempts to obtain it from the cache and the miss table entry for the item is updated in accordance with the result. When a copy of an item is added to the cache, miss table entries with the status miss are set to indicate unknown.

16 Claims, 8 Drawing Sheets

DYNAMIC CACHES WITH MISS TABLES

CROSS-REFERENCES TO RELATED APPLICATIONS

The present patent application is a continuation-in-part of U.S. Ser. No. 09/294,656, Cusson, et al., Web servers with queryable dynamic caches, filed Apr. 19, 1999, and. claims priority from U.S. Provisional Application No. 60/168,589, Cusson et al., Improving the performance of dynamic data caches by collecting multi-user query miss statistics, filed Dec. 2, 1999. The patent application contains the entire Detailed Description and drawing of U.S. Ser. No. 09/294, 656. The new material begins with FIG.7 and the section of the Detailed Description entitled Making cache misses faster.

BACKGROUND OF THE INVENTION

1. Field of the Invention

The invention concerns caching of data in networks generally and more specifically concerns the caching of queryable data in network servers.

2. Description of the Prior Art

Once computers were coupled to communications networks, remote access to data became far cheaper and easier than ever before. Remote access remained the domain of specialists, however, since the available user interfaces for remote access were hard to learn and hard to use. The advent of World Wide Web protocols on the Internet have finally made remote access to data available to everyone. A high school student sitting at home can now obtain information about Karlsruhe, Germany from that city's Web site and a lawyer sitting in his or her office can use a computer manufacturer's Web site to determine what features his or her new PC ought to have and then configure, order, and pay for the PC.

A consequence of the new ease of remote access and the new possibilities it offers for information services and commerce has been an enormous increase in the amount of remote access. This has in turn lead to enormous new burdens on the services that provide remote access and the resulting performance problems are part of the reason why the World Wide Web has become the World Wide Wait.

Figure 1:
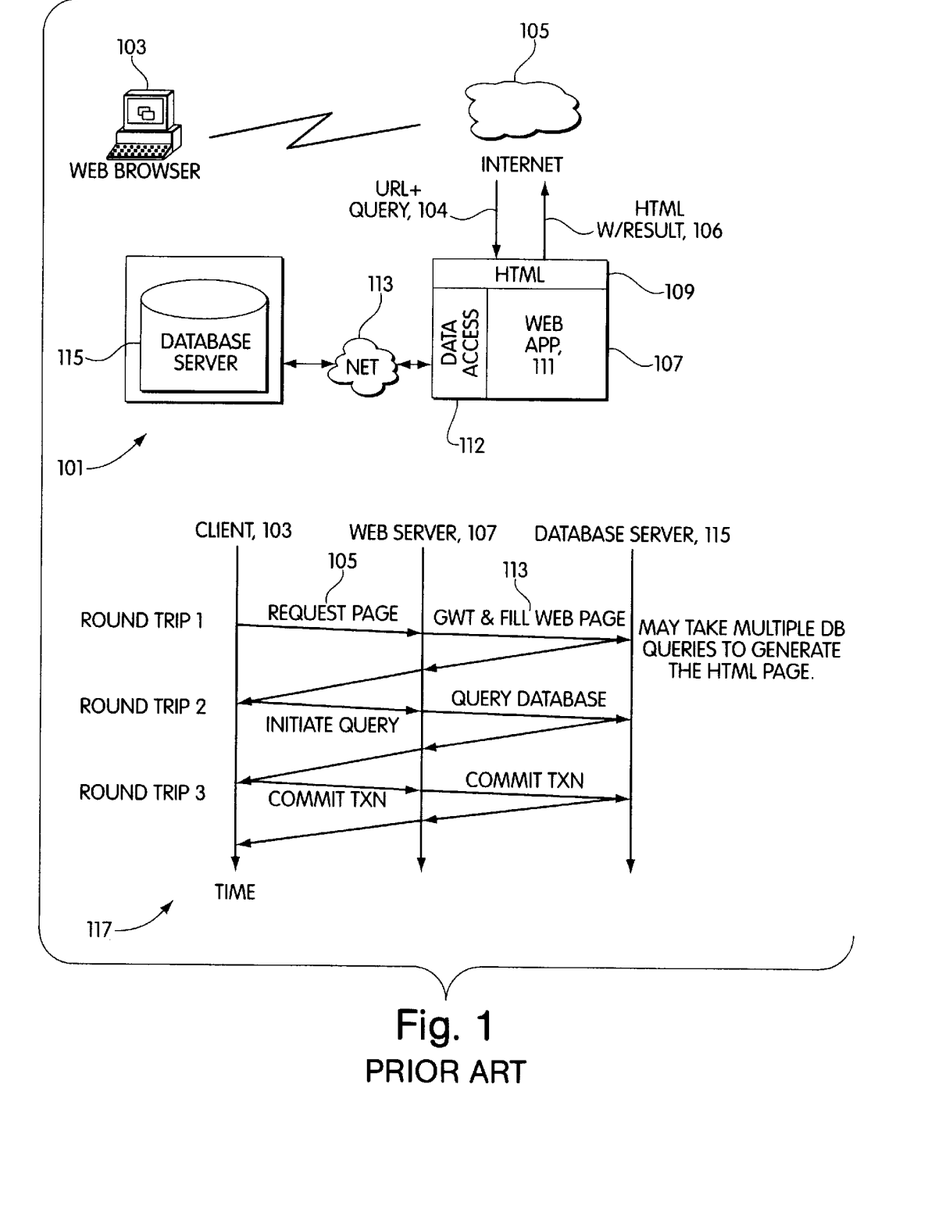
FIG. 1 is an example of a prior-art system for performing queries via the World Wide Web.

FIG. 1 shows one of the causes. of the performance problems. At 101, there is shown the components of the system which make it possible for a user at his or her PC to access an information source via the World Wide Web. Web browser 103 is a PC which is running Web browser software. The Web browser software outputs a universal resource locator (URL) 104 which specifies the location of a page of information in HTML format in the World Wide Web and displays HTML pages to the user. The URL may have associated with it a message containing data to be processed at the site of the URL as part of the process of obtaining the HTML page. For example, if the information is contained in a database, the message may specify a query on the data base. The results of the query would then be returned as part of the HTML page. Internet 105 routes the URL 104 and its associated message to the location specified by the URL, namely Web server 107. There, HTML program 109 in Web server 107 makes the HTML page 106 specified by the URL and returns it to Web browser 103. If the message specifies a query on the database in database server 115, HTML program 109 hands the message off to Web application program 111, which translates the message into a query in the form required by data access layer 112.

Data access layer 112 is generally provided by the manufacturer of database server 115. It takes queries written in standard forms such as OLE-DB, ODBC, or JOBC, converts the queries into the form required by database server 115, and places the queries in messages in the form required by network 113. Database server 115 then executes the query and returns the result via network 113 to data access layer 112, which puts the results into the required standard form and returns them to Web application 111, which in turn puts the result into the proper format for HTML program 109. HTML program 109 then uses the result in making the HTML page 106 to be returned to browser 103.

As may be seen from the above description, a response to a URL specifying a page whose construction involves database server 115 requires four network hops: one on Internet 105 from browser 103 to Web server 107, one on network 113 from server 107 to server 115, one on network 113 from server 115 to server 107, and one on Internet 105 from server 107 to browser 103. If more than one query is required for an HTML page, there will be a round trip on network 113 for each query.

Moreover, as shown at 117, a typical Web transaction is a series of such responses: the first HTML page includes the URL for a next HTML page, and so forth. The transaction shown at 117 begins with a request for an HTML page that is a form which the user will fill out to make the query; data base server 115 provides the information for the HTML page. When that page is returned, the user fills out the form and when he or she is finished, the browser returns a URL with the query from the form to server 107, which then deals with the query as described above and returns the result in another HTML page. That page permits the user to order, and when the user orders, the result is another query to database server 115, this time, one which updates the records involved in the transaction.

Not only do Web transactions made as shown in FIG. 1 involve many network hops, they also place a tremendous burden on data base server 115. For example, if data base server 115 belongs to a merchant who sells goods on the Web and the merchant is having a special, many of the-;transactions will require exactly the same sequence of HTML pages and will execute exactly the same queries, but because system 101 deals with each request from a web browser individually, each query must be individually executed by database server 115.

The problems of system 101 are not new to the designers of computer systems. There are many situations in a computer system where a component of the system needs faster access to data from a given source, and when these situations occur, the performance of the system can be improved if copies of data that is frequently used by the component are kept at a location in the system to which the component has faster access than it has to the source of the data. When such copies exist, the location at which the copies are kept is termed a cache and the data is said to be cached in the system.

Caching is used at many levels in system 101. For example, browser 103 keeps a cache of previously-displayed HTML pages, so that, it can provide a previously-displayed HTML page to the user without making a request for the page across Internet 105. Web server 107 similarly may keep a cache of frequently-requested HTML pages, so that it can simply return the page to the user, instead of constructing it. Database server 115, finally, may keep a cache of the information needed to answer frequently-made queries, so that it can return a result more quickly than if it were starting from scratch. In system 101, the most effective use of caching is in Web server 107, since data that is cached there is still accessible to all users of internet 105, while the overhead of the hops on data access 113 is avoided.

Any system which includes caches must deal with two problems: maintaining consistency between the data in the cache and the data in the data source and choosing which data to cache. In system 101, the first problem is solved in the simplest way possible: it is the responsibility of the component using the data to determine when it needs a new copy of the data from the data source. Thus, in browser 103, the user will see a cached copy of a previously-viewed HTML page unless the user specifically clicks on his browser's "reload" button. Similarly, it is up to HTML program 109 to determine when it needs to redo the query that provided the results kept in a cached HTML page. The second problem is also simply solved: when a new page is viewed or provided, it replaces the least recently-used cached page.

Database systems such as the Oracle8™ server, manufactured by Oracle Corporation and described in Leverenz, et al., Oracle8 Server Concepts, release 8.0, Oracle Corporation, Redwood City, Calif., 1998., move a copy of a database closer to its users by replicating the original database at a location closer to the user. The replicated data base may replicate the entire original or only a part of it. Partial replications of a database are termed table snapshots. Such table snapshots are read-only. The user of the partial replication determines what part of the original database is in the table snapshot. Consistency with the original database is maintained by snapshot refreshes that are made at times that are determined by the user of the table snapshot. In a snapshot refresh, the table snapshot is updated to reflect a more recent state of the portion of the original database contained in the snapshot. For details, see pages 30–5 through 30–11 of the Leverenz reference.

There are many applications for which the solution of letting the component that is doing the caching decide when it needs a new page causes problems. For example, when the information in a data source is important or is changing rapidly (for example, stock prices), good service to the user requires that the information in the caches closely tracks the information in the data source. Similarly, there are many situations where caching all data that has been requested causes problems. For instance, in a cache run according to least recently-used principles, any HTML page that is produced by HTML program 109 or received in browser 103 is cached and once cached, stays in the cache and takes up space that could be used for other HTML pages until it attains least recently-used status.

When Web server 107 includes a Web application 111 involving a database server 115, there is still another problem with caching in web server 107: since the data is cached in the form of HTML pages, it is not in queryable form, that is, a cached HTML page may contain data from which another query received from Web browser 103 could be answered, but because the data is contained in an HTML page instead of a database table, it is not in a form to which a query can be applied. Thus, even though the data is in server 107, server 107 must make the query, with the accompanying burden on data base server 115 and delays across network 113, and the HTML page containing the result of the query must be separately cached in server 107.

U.S. Ser. No. 09/294,656, Cusson, et al., Web servers with queryable dynamic caches, describes a web server 107 that has a cache in which cached data is to the extent possible in queryable form, in which the cached data is dependably updated when the data in the source changes, and in which selection of data from a source for caching is based on something other than the mere fact that a URL received from a web browser referenced the data, and thus provides a solution to the foregoing problems. The cache thus solves many of the problems of prior-art caches in network environments.

A remaining problem, however, is that the only way that Web server 107 can determine whether a query can be performed on the cache instead of on database server 115 is by doing the query on the cache and if a miss results, doing the query on database server 115. A query that goes to database server 115 as a result of a cache miss is thus substantially slower than one that goes directly to database server 115, and when there is a substantial number of cache misses, the result may be a substantial degradation of the overall performance of Web server 107 with a cache. It is an object of the present invention to make a query to database server 115 that results from a cache miss substantially as fast as a query that goes directly to database server 115.

SUMMARY OF THE INVENTION

The object is achieved by adding a miss table to a cache that contains copies of remotely-stored items. The query that is applied to the cache is in effect a specifier for the item that will be returned by the query. There may or may not be a copy of the item in the cache. If there is not, the remotely-stored item must be fetched. The miss table relates the specifier for the item to a status indicator that indicates at least whether the item is present in the cache. A dispatcher receives the specifier for the item and presents it to the miss table; if the miss table indicates that there is no copy of the item in the cache, the dispatcher uses the item specifier to fetch the remotely-stored data item.

The status indicator may further indicate that it is unknown whether there is a copy of the item in the cache. When the status indicator so indicates, the cache responds to the remote item specifier and provides an indication whether there is a copy of the item in the cache. A miss table manager for the miss table responds to the indication by updating the miss table in accordance with the indication. The cache further provides the miss table manager with a change event notification to the miss table manager when the contents of the cache have changed and the miss table manager responds thereto by setting the status for at least those items for which the status in the miss table indicates that there is no copy and which are affected by the change to unknown.

In an preferred embodiment, the miss table is employed in a network server that includes a cache. The cache may contain a copy of a rowset from a remote location and responds to a rowset specifier specifying the remote location by returning the rowset when there is a copy in the cache. The miss table relates the rowset specifier to a status indicator as described above. If the miss table indicates to the network server that there is no copy of the rowset in the cache, the network server fetches the rowset from the remote location.

Other objects and advantages will be apparent to those skilled in the arts to which the invention pertains upon perusal of the following Detailed Description and drawing, wherein:

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The following Detailed Description will begin with a conceptual overview of the invention and will then describe a presently-preferred embodiment of the invention.

Figure 2:
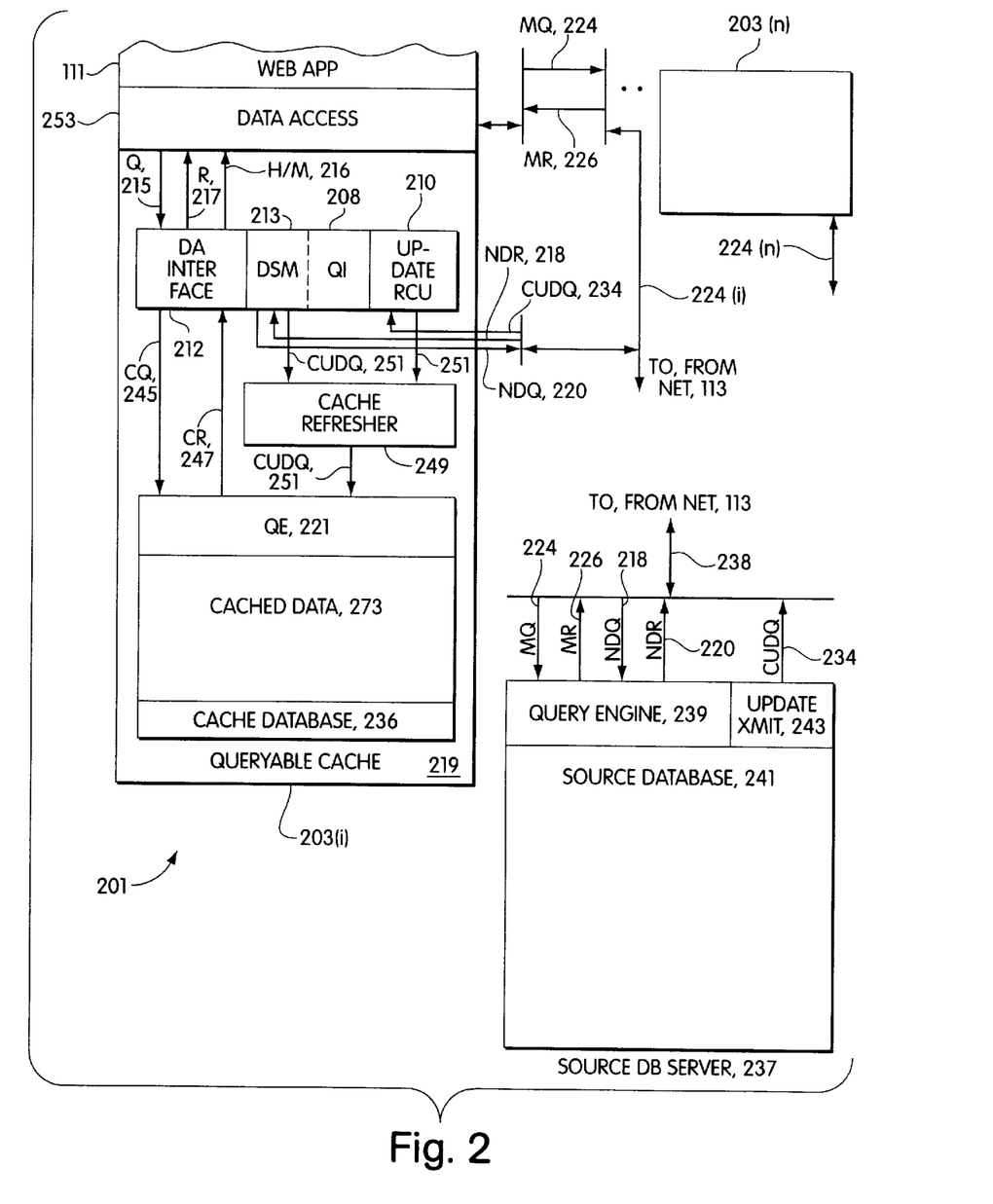
FIG. 2 is a high-level block diagram of a system of the invention.

Overview of the Invention: FIG. 2

FIG. 2 shows a system 201 for retrieving information via a network which includes one or more network servers 203(0 . . . n). Each server 203(i) includes a queryable cache 219 that is automatically updated when information cached in cache 223 changes in source database 241 and in which the contents of cache 223 are determined by an analysis of what queries will most probably be made by users of server 203(i) in the immediate future. Server 203 is a Web server 107, and thus has an HTML component 109, a Web application component 111, and a data access component 253 which is a version of data access component 112 which has been modified to work with queryable cache 219. Server 203 could, however, communicate with its users by any other kind of network protocol. Server 203 further communicates with source data base server 237 by means of network 213, which may use any protocol which is suited to the purpose.

FIG. 2 shows one server 203, server 203(i), in detail. As before, Web application 111 provides a query in a standard form to data access 253. Here, however, data access 253 has access not only to source database server 237 via network 113, but also to queryable cache 219, which contains a cache data base 236 that has a copy 223 of a portion of the data in source database 241. When data access 253 receives a query from web application 111, it first presents the query to queryable cache 219, as shown at Q 215. If cached data 223 includes the data specified in the query, queryable cache 219 returns result (R) 217, which data access 253 returns to Web application 111. If cached data 223 does not include the data specified in the query, queryable cache 219 returns a miss signal (M) 216 to data access 253, which then makes the query via network 113 to source database server 237 and when it receives the result, returns it to Web application 111. The query made in response to the miss signal appears as miss query (MQ) 224 and the response appears as miss response (MR) 226.

It is important to note here that because the interactions with queryable cache 219 and with source database server 237 are both performed by data access layer 253, the existence of queryable cache 219 is completely transparent to Web application 111. That is, a Web application program 111 that runs on Web server 107 will run without changes on Web server 203(i).

Continuing in more detail with queryable cache 219, the data cached in queryable cache 219 is contained in cache database 236, which, like any database, contains data, in this case, copies of datasets (database tables) from source database 241 that are cached in queryable cache 219,.and a query engine (QE 221), which runs queries on the datasets in cached data 223. The portion of queryable cache 219 which receives queries from data access layer 253 is data access interface 212. Data access interface 212 has two functions:

It determines whether the query can be executed on cached data 223 required to execute query 215 and generates miss signal 216 if it does not.

If cached data 223 does contain the data, it puts query 215 into the proper form for cache database 236.

Data access interface 212 makes the determination whether the query can be executed by analyzing the query to determine the query's context, that is, what datasets are required to execute the query and then consulting a description of cached data 223 to determine whether these datasets are present in cached data 223. The datasets are specified in the query by means of dataset identifiers, and consequently, the context is for practical purposes a list of the identifiers for the required data sets. The description 223 of course includes the dataset identifiers for the cached data sets. If the required datasets are present, data access interface 212 makes cache query 245, which has the form required to access the data in cache data base 236. Cache database 236 returns cache result 247, which data access interface 212 puts into the form required for result 217.

Because cached data 223 is contained in cache database 236, cached data 223 is queryable, that is, if a dataset is contained in cached data 223, queryable cache 219 can return as a result not only the entire dataset, but any subset of that dataset that can be described by a query. For example, if cached data 223 includes a dataset that lists all of the kinds of shirts sold by a company engaged in Web commerce and the list of kinds includes the colors that each kind of shirt is available in, queryable cache 219 will be able to handle a query for which the result is a list of the kinds of shirt that are available in red.

Cached data 223 is kept consistent with source database 241 by means of update transmitter 243 in source database server 237 and update receiver 210 in queryable cache 219. Whenever a change occurs in source database 241 in a dataset of which there may be a copy in cached data 223, update transmitter 243 generates a cache update query (CUDQ) 234 specifying the change and sends CUDQ 234 via network 113 to each of servers 203(0 . . . n). Update receiver 210 receives CUDQ 234 from network 113 and determines from the data set description maintained by DA 212 whether the dataset is in face in cached data 223; if it is, it puts the cache update query into the proper form 251 for cache database 236 and provides it to cache refresher 249, which then runs update query 251 on cache database 236.

Data set manager (DSM) 213 decides generally what copies of datasets from source database server 237 are to be included in cache database 236. The information that DSM 213 uses to make this determination is contained in query information 208. Query information 208 may be any information available to server 203(i) which can be used to predict what datasets of source database 241 will most probably be queried in the near future. For example, if a company engaged in Web commerce is having a 1-day sale on certain items for which there are datasets in source database 241, query information 208 may indicate the datasets for the items and the time of the 1-day sale. Using that information, DSM 213 can obtain the datasets from source database 241 and cache them in cache database 236 before the beginning of the sale and remove them from cache database 236 after the end of the sale.

Another kind of query information 208 is a query log, a time-stamped log of the queries received from data access layer 253; if the log shows a sharp increase in the occurrence of queries for a given dataset, DSM 213 should cache the datasets for that query in cache 219 if they are not there already. Conversely, if the log shows a sharp decrease in the occurrence of such queries, DSM 213 should consider removing these datasets from queryable cache 219. When DSM 213 determines that a dataset should be added to queryable cache 219, it sends a new data query (NDQ) 218 via network 113 to source data base 241 to obtain the new data and when DSM 213 has the response (NDR 220), it sends a delete query to query engine 221 indicating the data to be deleted in cached data 223 to make way for the new data and then sends a cache update query 251 to cache refresher 249 to update the cache.

Data set manager 213 and query information 208 may also be implemented in part in source data base server 237 or anywhere where information about the probability of future queries may be obtained. When implemented in source data base server 237, the query log would log each query 231 to source database 241 and at least the portion of data set manager 213 which reads the query log to determine what new data needs to be cached would be in source database server 237; when it determined that new data needed to be cached, it would send an update query with the new data to each of the servers 203. The component of DSM 213 that determines what is to be removed could also be in source database server 237, in which case, all queryable caches 219 would contain the same data in cached data 223, or that component could be in each server 203(i), with the component making decisions concerning what data to remove to accommodate the new data based on the present situation in server 203(i). In such an arrangement, there can be a local query log in each server 203 in addition to the global query log in source database server 241. Such an arrangement would permit different servers 203 to have different-sized caches 223; it would also permit different servers 203 to take local variations in the queries they are receiving into account in determining what data to remove from cache 219. One way such variations might occur is if system 201 were set up so that different servers 203 preferentially received queries from users in different geographical locations.

FIG. 2 shows only a single source database server 237; there may of course be more than one; moreover, source database server 237 need not be a classical database system. Server 203(i) can be set up to be used with data sources containing any kind of queryable data, where queryable is defined as having a form which can be represented as a set of numbered rows of data. Such a set of numbered rows is termed a rowset. Database tables are of course one example of rowsets; others are files of data records, text files, and still and moving image data. If server 203(i) is used with data sources having only a single kind of queryable data, queryable cache 219 need only be set up to deal with that kind of queryable data.

If server 203(i) is used with data sources having more than one kind of queryable data, cache database 236 may be set up using a rowset representation that will accommodate all of the different kinds of queryable data. In that case, DA 212, DSM 213, and update receiver 210 will translate between the results and update queries received from the various data sources and the representations used in cached data 236. In other embodiments, there may be more than one cache database 236 in queryable cache 219, with different cache databases being used for different kinds of queryable data. Again, DA 212, DSM 213, and update receiver 210 will perform the necessary translations.

Figure 3:
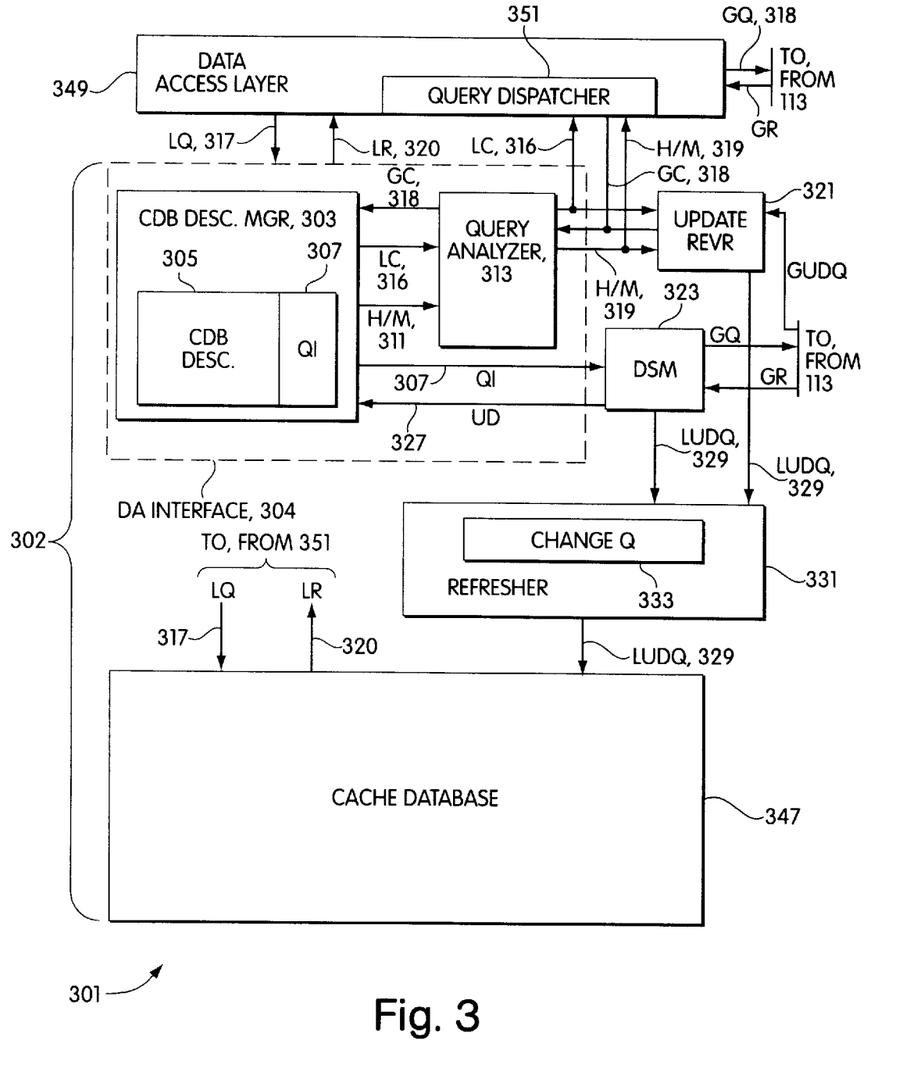
FIG. 3 is a detailed block diagram of details of an implementation of server 203.
Figure 5:
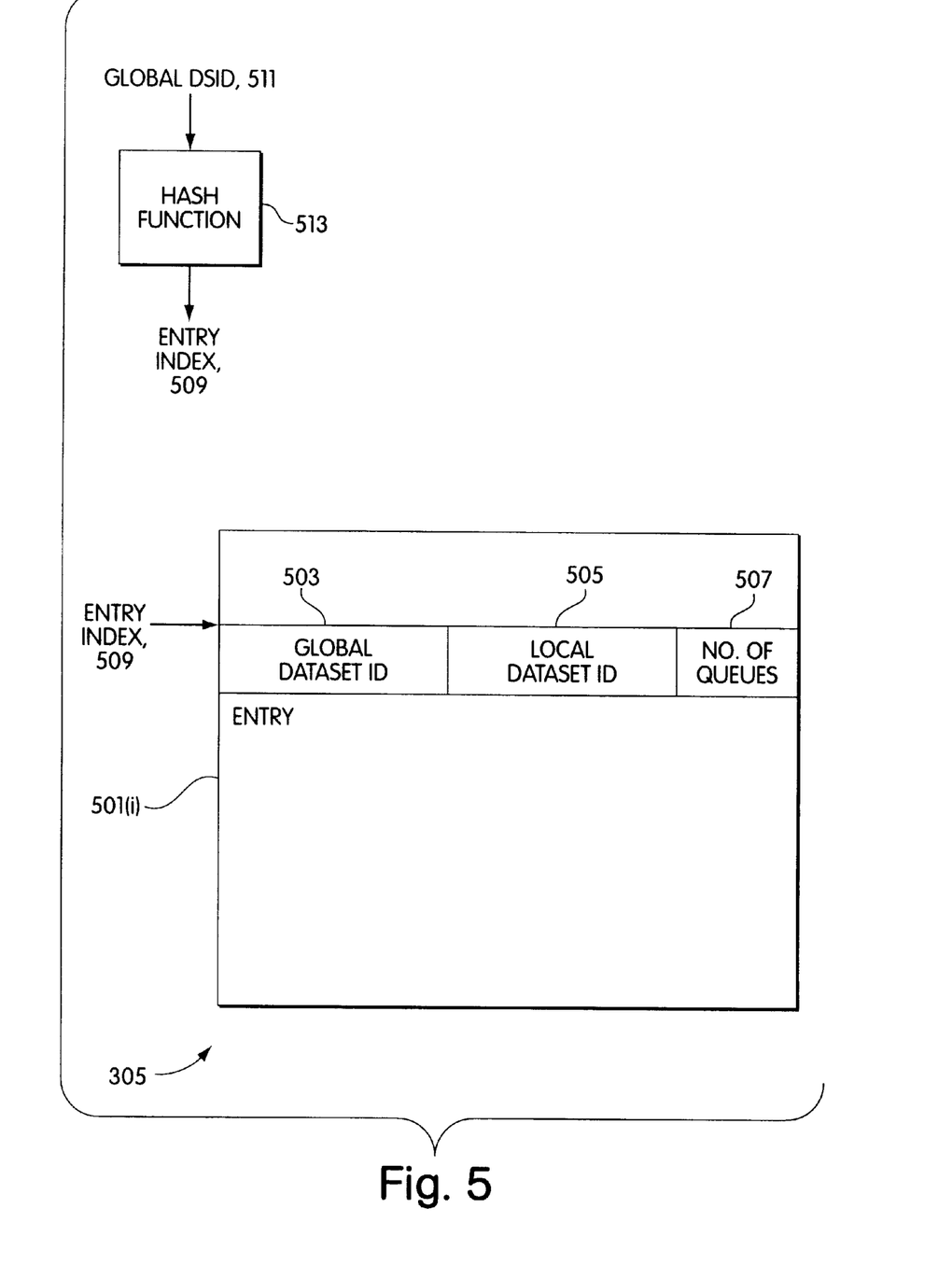
FIG. 5 is a detail of cache database description 305.
Figure 6:
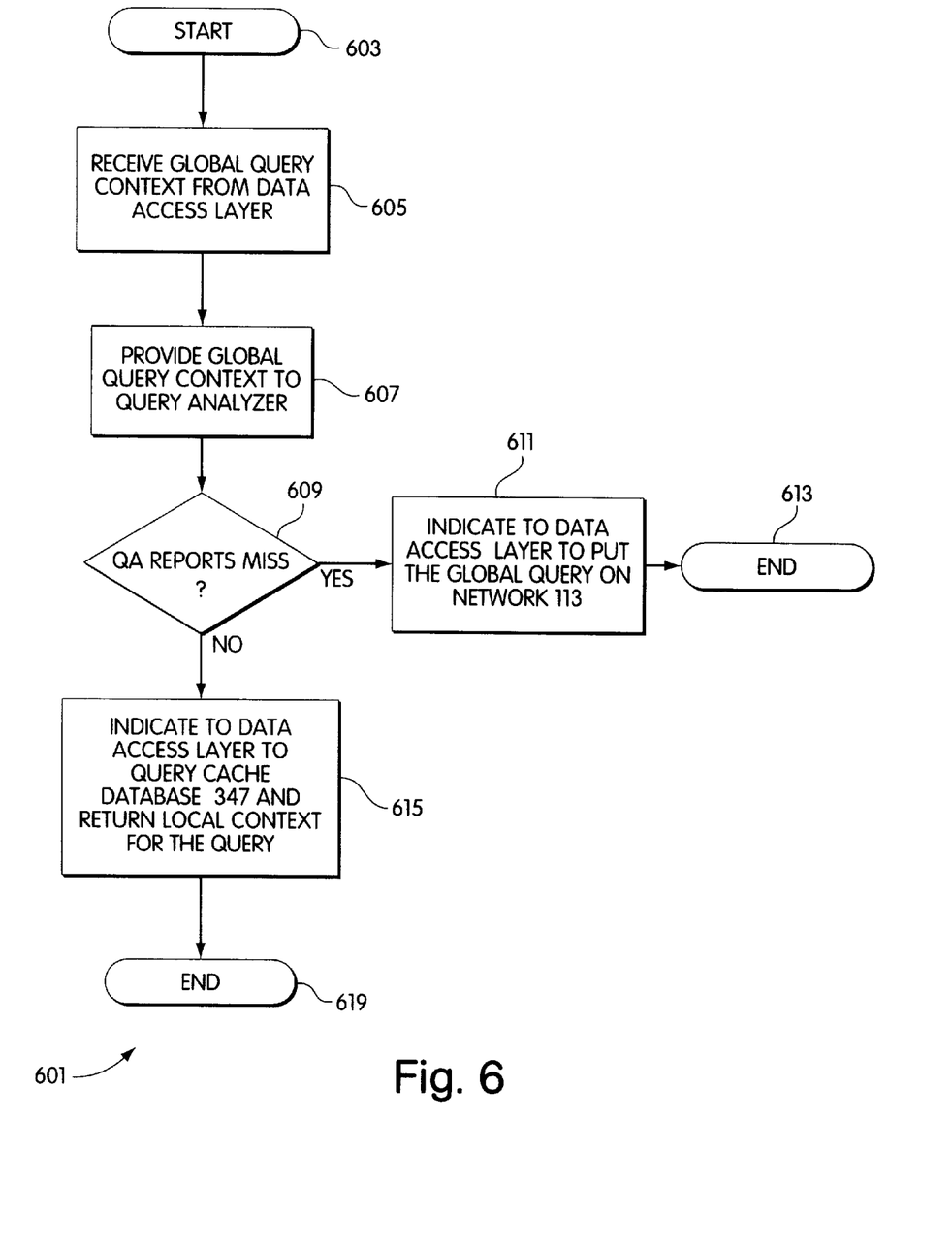
FIG. 6 is a flowchart of the operation of query dispatcher 351.

Details of a Preferred Embodiment of a Data Access Layer and a Queryable Cache FIGS. 3, 5, and 6

FIG. 3 shows a preferred embodiment 301 of data access 349 and queryable cache 302. Corresponding components of FIGS. 2 and 3 have the same names. Cache database 347 in embodiment 301 is an Oracle8 Server, which is described in detail in Leverenz, et al., Oracle8 Server Concepts, release 8.0, Oracle Corporation, Redwood City, Calif., 1998. In preferred embodiment 301, Web application 111 uses global data set identifiers in queries. The Web applications 111 in all of the servers 203 use the same set of global data set identifiers. A cache data base 347 in a given server 203 has its own set of local data set identifiers for the data sets cached in cache data base 347. In preferred embodiment 301, then, one may speak of global queries and query contexts that use global data set identifiers and local queries and query contexts that use local data set identifiers. In the preferred embodiment, query analyzer 313 uses cached data base description 305 to translate global query contexts into local query contexts.

Data access layer 349 includes a new component, query dispatcher 351, which is the interface between data access layer 349 and queryable cache 302. FIG. 6 is a flowchart 601 of the operation of query dispatcher 351 in a preferred embodiment. Reference numbers in parentheses refer to elements of the flowchart. When data access layer 349 is preparing to query source database 241, it provides the global context for the query to query dispatcher 351 (605), which in turn provides global context 318 (FIG. 3) to query analyzer 313 (607). Query analyzer 313 determines whether the datasets identified by the global context are cached in cache database 347; if they are not, query analyzer 313 reports a miss 319 to query dispatcher 351 (609), which indicates to data access layer 349 that it is to place the global query on network 113.

If the datasets identified by the global context are cached in cache database 347, query analyzer 313 indicates that fact to query dispatcher 351 and also provides query dispatcher 351 with local context 316 for the datasets in cache database 347 (615). Query dispatcher 351 then provides the local context to data access layer 349, which uses the local context to make a local query 317 corresponding to the global query and then uses the local query to obtain local result 320 from cache database 347. It should be noted here that the operations involved in the translation from the global query to the local query and applying the local query to cache database 347 may be divided among data access layer 349, query dispatcher 351, and query analyzer 313 in many different ways; the advantage of the technique of flowchart 601 is that data access layer 349 can employ the same mechanisms to make local queries as it does to make global queries. All query analyzer 313 and query dispatcher 351 need do is supply data access layer 349 with the local context needed to make the local query.

Continuing with the details of queryable cache 302 and beginning with DA interface 304, interface 304 receives a global context 318 from query dispatcher 351 and depending on whether the datasets for the queries are in cache database 347, provides either local context 316 or a miss signal 319.

DA interface 304 has two main components: query analyzer 313 and cache database description manager 303.

Query analyzer 313 analyzes global contexts received from data access layer 253 and other components of embodiment 301 to obtain the global context's global dataset identifiers. Having obtained the global dataset identifiers, query analyzer 313 provides them to CDB description manager 303, which looks them up in cache database description 305. Cache database description 305 is a table of datasets. At a minimum, there is an entry in the table for each dataset that has a copy in cache database 347. Each such entry contains the dataset's global identifier and its local identifier. The table also contains query information 307. CDB description manager 303 then returns an indication of whether the dataset is in cache database 347 (H/M 311). If it is not, the query cannot be run on cache database 347, but must be run on source database 241, and consequently, query analyzer 313 returns a miss signal 319 to query dispatcher 351. If the query can be run on cache database 347, query analyzer 313 returns a hit signal 319 and also returns local context 316 for the query. As indicated above, query dispatcher 351 then provides local context 316 to data access layer 349, which uses it to make local query 317 on cache database 347. Cache database 347 then returns local result 320 to data access layer 349.

FIG. 5 shows details of CDB description 305. In a preferred embodiment, it is a table which has at least an entry 501 for each dataset of source database 241 of which here is a copy in cache database 347. Each entry 501 contains the global dataset identifier for the data set, by which the dataset is known in all servers 107 with queryable caches 219 containing copies of the dataset, the local data set identifier 505, by which the dataset is known in cache database 347, and number of queries 507, which indicates the number of times the dataset has been queried over an interval of time. In the preferred embodiment, number of queries 507 embodies query information 307.

An entry 501(*i*) for a given dataset is accessed in a preferred embodiment by a hash function 503, which takes global dataset ID 507 for the dataset and hashes it into an entry index 509 in table 305. CDB description manager 303 then searches table 305 for the entry 501 whose field 503 specifies global DSID 511 beginning at entry index 509. If no such entry is found, the dataset is not in cache database 347 and CDB description manager 303 signals a miss 311 to query analyzer 313. Table 305 may also include entries 501 for global datasets that are not presently cached in cache database 347; in such entries, local dataset ID 505 has a null value and a miss is returned in response to the null value. The purpose of such entries is to maintain number of queries information 507 for such data sets, so that dataset manager 323 can determine whether to add the entry's dataset to cache database 347.

Update Rcvr 321 receives update queries provided by source database server 237 from data access 253 and uses query analyzer 313 to determine whether the dataset affected by the update is in cache database 347. If it is not, update rcvr 321 ignores the update; otherwise, it places update query 329 in change queue 333. Refresher 331 reads queue 333 and executes its queries.

Data store manager 323 uses query information 307 in CDB description 305 to determine what datasets to add to or delete from cache database 347. With datasets to be added, DSM 323 makes the necessary queries to source database 241 and when the results arrive, DSM 323 makes them into update queries 239 and provides the update queries 329 to change queue 333, from which they are executed by refresher 331 as described above. DSM 323 further updates CDB description 305 as required by the changes it makes in cache database 347, as shown at 327.

In a preferred embodiment, DSM 323 and refresher 331 have their own threads or processes. It should also be pointed out here that CDB description 305 and change queue 333 could be implemented as database tables in cache database 347. Because these components are implemented independently of cache database 347 and because abstract query translator 339 is used as an interface to cache database 347, embodiment 301 is to a large extent independent of the particular kind of database system employed to implement cache database 347. In embodiment 301, data access 203 only provides read queries to data access interface 304. All update queries go directly to server 237, without the update being entered in cache database 347. In other embodiments, queryable cache 219 may be implemented as a writethrough cache, i.e., the update may be entered in cache database 347 and also sent to server 237. It should be pointed out here that most Web applications are mostly-read applications, that is, a Web user typically spends far more time reading information than he or she does changing it. For instance, in Web commerce, the "shopping" is mostly a matter of reading HTML pages, with updates happening only when the user adds something to his or her "shopping cart" or makes his or her purchases. In a system such as system 201, only making the purchases would typically involve an update of source database 241.

Figure 4:
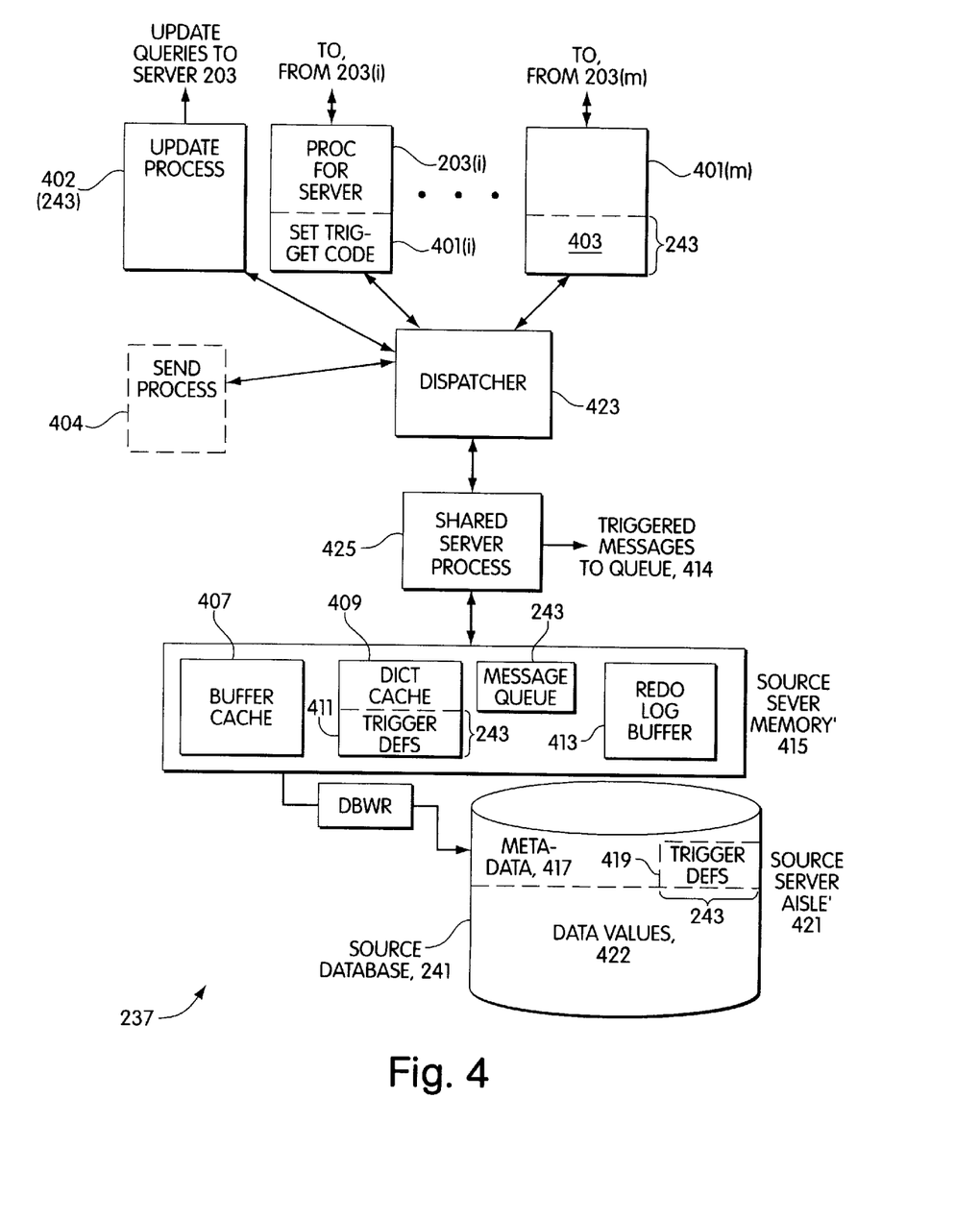
FIG. 4 is a detailed block diagram of details of an implementation of source database server 237.

Details of Source database Server 237: FIG. 4

FIG. 4 shows a preferred embodiment of source database server 237. Source database server 237 in the preferred embodiment is implemented by means of an Oracle8 server executing on a computer system that includes a disk drive 421 on which is stored source database 241 and memory 415 which contains buffer cache 407 for copies of data values 421 from database 241 and dictionary cache 409 for copies of metadata from database 241. Metadata is database tables whose contents describe the data in the database. Writebacks of cached data in server memory 415 to source database 241 are handled by database write process 325. Each of processes 401(0 . . . *n*) represents and corresponds to a server 203 and handles queries resulting from cache misses, update queries, and queries from DSM 323 in the corresponding server 203. Dispatcher 311 gives each of these processes in turn access to shared server process 317, which performs the actual queries and returns the results to the querying process, which in turn returns the results via network 235 to its corresponding server 203.

The Oracle8 implementation of source database server 237 is a standard Oracle8 database system to which has been added an implementation of update transmitter 243, which automatically sends an update to queryable cache 219 in each of the servers 203(0 . . . *n*) when data in source database 241 that has been copied to cached data 223 changes. The components of updater 243 in FIG. 4 are labeled with the reference number 243 in addition to their own reference numbers. The implementation of updater 243 in the preferred embodiment employs database triggers. A database trigger is a specification of an action to be taken if a predefined change occurs in a data value or an item of metadata in the database. Many database systems permit definition of triggers; triggers in the Oracle8 database system are described in detail at pages 17–1 through 17–17 of the Leverenz reference.

In the preferred embodiment, when a process 401(*i*) corresponding to a server 203(*i*) receives a query from DSM 323 in server 203(i) for data to be added to server 203(i)'s cached data 223, process 203(i) executes set trigger code 403. This code sets an Oracle8 AFTER row trigger in metadata 417 for each row of data and/or metadata specified in the query. Shared server process 317 takes the action specified in the trigger whenever the trigger's row of data has been modified. The action specified for the trigger is to send a message to each of the servers 203(0 . . . n) with an update query that modifies the data in cached data 223 in the same fashion as it was modified in source database 241. In the preferred embodiment, the action performed by the trigger is to place the message with the update query in message queue 414, which is implemented as an Oracle8 advanced queue. Message queue 414 is read by update process 402, which sends the messages in queue 414 to each of the servers 203(0 . . . n).

Adding new data to cached data 223 in response to or in anticipation of changes in the behavior of the users of internet 105 and updating cached data 223 in response to changes in source database 241 may of course be implemented in many other ways in the preferred embodiment shown in FIGS. 3 and 4. For example, determining what data should be in cached data 223 could be done in source DBS server 237 instead of in each of the servers 203. Source database 241, like the cached databases 347 in the servers 203(0 . . . n), can maintain statistics information, and a send process 404 in source server 237 can analyze the statistics in substantially the same fashion as described for DSM 323, determine what data should be sent to the servers 203(0 . . . n) for caching in cached data 223, make update queries for that data, and place messages containing the update queries in message queue 414, from which update process 402 can send them to the servers 203.

Updating cached data 223 in response to changes in source database 241 can also be implemented without triggers. The Oracle8 database system includes a redo log 413 in source server memory 415 which is a circular buffer of updates that have been performed on source database 241. The database system maintains the log so that it can redo updates in case of system failure, but the log can also be used to update cached data 223. If there is a table in source database 241 which describes cached data 223, update process 402 can use the table in conjunction with redo log 413 to determine whether an update in redo log affects cached data 223. If it does, update process 402 can send a copy of the update query to the servers 203 as just described.

Caching Servers and Source Servers That Do Not Involve Database Systems

The techniques used to determine what data should be cached in server 203 and to update cached data 223 can also be employed in systems where the data is not queryable. For example, the source data may simply be a collection of documents, identified perhaps by a document number (such as its URL, if the document is an HTML page), and the cached data may be simply a subset of the collection. What cache web application 211 would receive from HTML component 109 in such a system would simply be the document number for a document; if it is present in the cached data, the caching server would return it from there; otherwise, it would fetch it from the source server. Query log 205 in such a case would be a time-stamped list of the documents that had been requested, together with an indication of whether the document was in the cached data. DSM 213 in such an embodiment would determine as described above for the database whether a document should be included in the cached data, and having made the determination, would obtain it from the source server. As also described above, a send component on the source server could make the same determination and send the document to the caching servers.

For update purposes, the source server would simply maintain a list of the documents that were presently in the caching servers; if one of the documents on the list was updated, updater 243 would send the new version of the document to the caching servers, where DSM 213 would replace any copy of the document in the cache with the new copy. The techniques just described for documents could of course also be used with files and with audio, image, and motion picture data.

Making Cache Misses Faster

Most dynamic caches are "load on miss" caches, that is, the system to which the cache belongs presumes that data that is being referenced is in the cache, and if a miss occurs, indicating that the data is not in the cache, the system finds the data, fetches it, and loads it into the cache. In a "load on miss" cache, only the first reference to uncached data results in a miss and on the miss, the time it takes to determine whether a miss has occurred is not important compared with the time it takes to find, fetch, and load the data into the cache.

Cache 302, on the other hand, is not a "load on miss" cache. As described above, what data is contained in cache 302 is determined by dataset manager 323, which uses query information 307 along with other information to determine what data will most probably be queried in the near future. In some cases, data set manager 323 may not even put frequently-queried data into cache 302. For example, if the data in question is changing at a rapid rate in source database 241, the cost in system resources of always directing the query to source database 241 may be less than the cost of updating cache 302 every time the data changes in source database 241.

Because a miss on cache 302 does not result in data being loaded into the cache, the cost of determining whether a miss has occurred is not "lost" in the cost of finding, fetching, and loading the data into the cache. Moreover, because a miss does not result in data being loaded, there will generally be more misses than in a "load on miss" cache. For both of these reasons, there is a need in cache 302 to reduce the cost of a miss so that in general, a query to source database 241 that comes about as a result of a miss on cache 302 takes little or no more time than a query that is simply made directly to source database 241.

Figure 7:
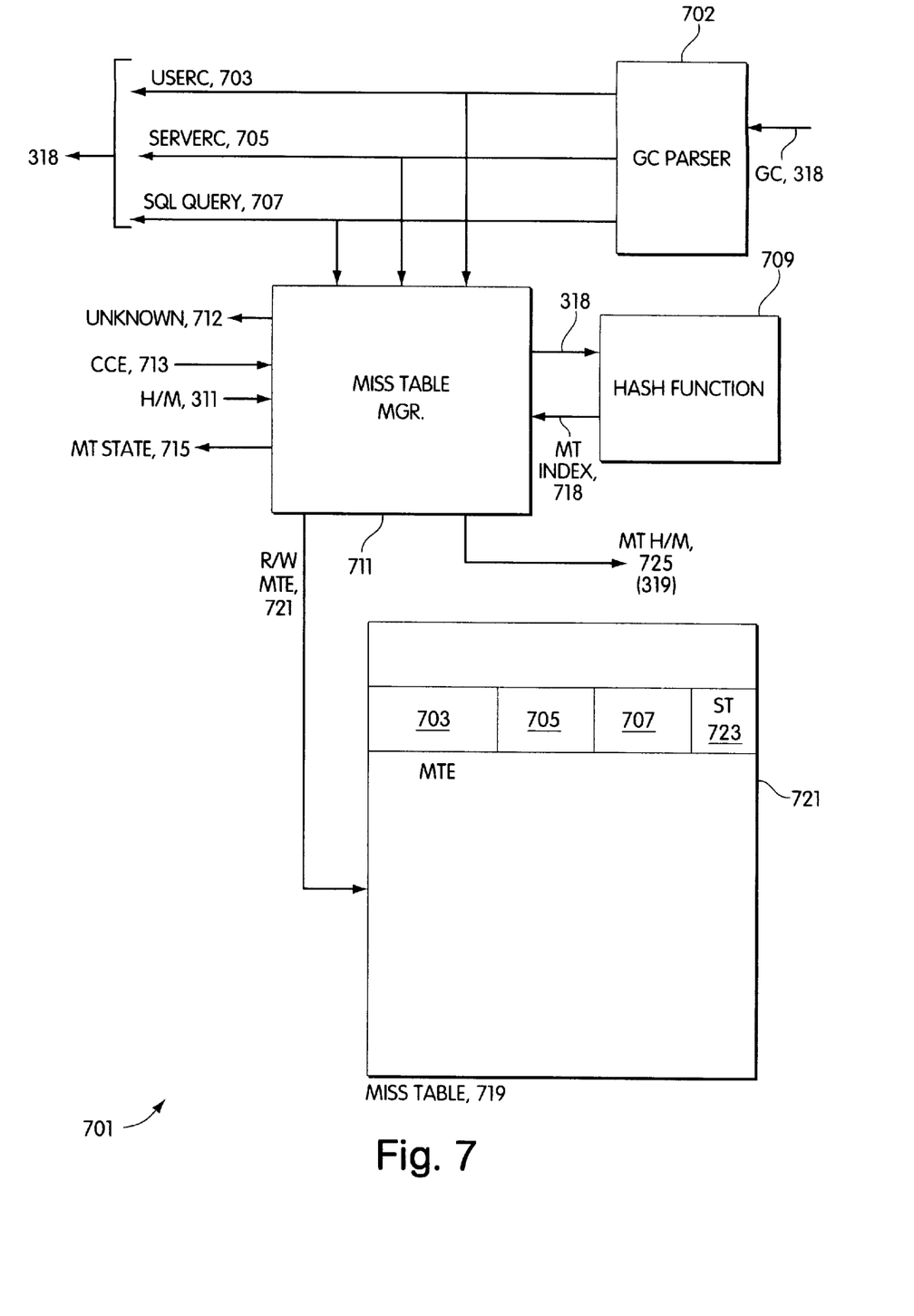
FIG. 7 is an overview of a miss table as used in query analyzer 313 of queryable cache 302.

FIG. 7 shows the apparatus used in a preferred embodiment of cache 302 to reduce the cost of the miss. Cache miss accelerator 701 is a component of query analyzer 313. The chief component of cache miss accelerator 701 is miss table 719, which contains a number of miss table entries 721. Each miss table entry 721 represents a query made to a rowset in a source server 237. The entry 721 for a given query and source server contains a state value 723 which indicates one of at least the following:

a hit: the rowset specified by the query is in cache 302;
a miss: the rowset specified by the query is not in cache 302;
unknown: it is unknown whether the rowset specified by the query is in cache 302.

If a query has a miss table entry 721 in miss table 719 and state value 723 indicates that the rowset specified by the query is not in cache 302, there is no need to search cache database description table 305 to determine whether the rowset is in the cache. The difference in the amount of time it takes to make a query to source database 241 that results from a miss and the amount of time it takes to make a direct query to source database 241 is simply the time it takes to find the query's entry 721 in miss table 719.

The remaining components of cache miss accelerator 701 serve to accelerate the process of finding a query's entry 721 in miss table 719 and to maintain miss table 719. As described above, a query as originally received in data access layer 349 has a global context 318, which specifies the query in the terms required for source database 214. A query to cache database 347 must, however, specify the query in the terms required for cache database 347. These terms are the query's local context 316. One of the tasks of query analyzer 313 is to parse the global context into its components, so that CDB description manager 303 can translate the global context 318 into the corresponding local context 316. This parsing task is performed by GC parser 702, which divides global context 318 into user context 703, which identifies the user(s) making the query, server context 705, which identifies source database 214, and SQL query 707, which is the SQL statement specifying the query to be made on source database 214.

All three components of global context 318 are necessary to completely characterize a query, so all three are provided to accelerator 701. Each miss table entry 721 corresponds to a <user, server, query>tuple. Thus, each miss table entry 721 includes in addition to status field 723 a field 703 indicating the user context, a field 705 indicating a source database 214, and a field 707 indicating an SQL query. An important property of accelerator 701 is that there is only one miss table entry 721 for a given <user, server, query>tuple. ST 723 in that miss table entry thus makes the experience of any entity making a query with the given tuple available to all entities making queries with the given tuple. This property of accelerator 701 is particularly important in situations where the user is identified by an Internet protocol address that is shared by many different actual users.

Miss table manager 711 is a collection of routines which provides the interface between miss table 711 and the rest of query analyzer 313. Miss table manager 711's most frequent operation is reading the value of status 723 in miss table entry 721 for a given source database and query and reporting whether the entry indicates a hit or miss to query analyzer 313, which in turn passes the report to data access layer 349. The operation proceeds as follows: When a user wishes to query the source database, the user provides the global query to data access layer 349. Query dispatcher 351 then provides global context 318 to query analyzer 313. Parser 702 parses global context 318 into its components, and all three components go to miss table manager 711, as shown in FIG. 701. To ensure rapid access, miss table 719 is implemented as a hash table, using techniques that are well-known in the art. Miss table manager 711 provides UserC 703k ServerC 705, and SQL query 707 to a hash function 709, which returns an index value 718 corresponding to tuple <703,705,707>. If there is a MTE 721 for that tuple <703,705,707>, miss table manager 711 can quickly locate the entry using index value 718. To determine whether the proper MTE 721 has been found, miss table manager 711 compares the values of the tuple <703,705,707> in the MTE 721 with the values of the tuple <703,705,707> received from GC parser 702.

Once miss table manager 711 has located the proper MTE 721, miss table manager 711 reads status value 723. If it indicates that the rowset corresponding to the entry's tuple <703,705,707> is not in cache 302, miss table manager 705 reports a miss to query analyzer 313, which passes it on to data access layer 349, as indicated by arrow 725, which, as indicated by the reference number in parentheses, performs the function of hit/miss indicator 319 of FIG. 3. Query analyzer 313 further responds to the miss by not passing global context 318 on to CDB description manager 303

If the proper MTE 721's state value 723 indicates a hit, miss table manager 711 reports that as well to query analyzer 313, which passes the result to data access layer 349. These components then function as previously described, with query analyzer 313 providing global context 318 to CDB description manager 303, CDB description manager 303 returning local context 316 to query analyzer 313, and query analyzer 313 providing it to data access layer 349, which uses local context 316 to make a local query 317 to query cache database 347.

If the proper MTE 721's state value 723 indicates "unknown", miss table manager 711 reports that fact to query analyzer 313, as indicated by arrow 712, and query analyzer 313 provides CDB description manager 303 with MTE 721's tuple <703,705,707>. CDB description manager 303 then searches CDB descriptions 305, and CDB description manager 303 provides H/M 311 to query analyzer 313 according to the results of the search. Query analyzer 313 then provides H/M 311 to miss table manager 711. If H/M 311 indicates that the rowset represented by tuple <703,705,707> is in cache database 347, miss table manager 711 sets status field 723 in MTE 721 to indicate a hit; query analyzer 313 also indicates a hit via 319 to data access layer 349 and uses CDB description manager 303 to obtain local context 316 for data access layer 349. If H/M 311 indicates a miss, query analyzer 313 provides the miss to miss table manager 711 and to data access layer 349, and miss table manager 711 sets status field 723 to indicate a miss.

If there is no entry in miss table 719 for tuple <703,705,707> from global context 318, miss table manager 711 makes an entry and places it at the index returned by hash function 709 for the tuple. State 723 is set to "unknown" in the entry and miss table manager 711 then proceeds as described above for MTEs 721 with state values 723 indicating "unknown."

In a preferred embodiment, there is a fixed number of MTEs 721 and when a new MTE 721 is required but none is available in miss table 719, the miss table manager selects a MTE 721 currently in the table for reuse. The selection is done on the basis of least frequent use. Miss table manager 711 keeps track of the frequency of use of MTEs 721 and of the MTE's status 723. A use of an MTE 721 with a status of "miss" has a much higher weight than a use of an MTE with the status "hit" or the status "unknown", and thus MTEs 721 with the status "miss" tend to stay in miss table 729 longer than MTEs 721 that have one of the other statuses.

In addition to making MTEs 721 and providing and setting the status values in MTEs 721, miss table manager 711 has to ensure that the contents of miss table 719 track the contents of CDB description 305. In a preferred embodiment, this is done in response to a cache change event which CDB description manager 303 provides to query analyzer 313 whenever a copy is added to database 347. Query analyzer 313 provides the cache change event to miss table manager 711, which responds by setting state value 723 in all of the MTEs in miss table 719 whose status value 723 indicates "miss" to "unknown". As queries corresponding to the MTEs 721 come in, miss table manager 711 deals with those MTEs 721 as described above for MTEs 721 with the status value "unknown". In other embodiments, CDB description manager 303 may provide a description of the added copy along with the cache change event, and in such embodiments, miss table manager 711 may only change the status of MTEs 721 representing queries that are affected by the presence of the added copy.

In a preferred embodiment, the status value 723 of MTE 721 for a tuple <703,705,707> is part of query information 307; consequently, as indicated by arrow 715, miss table manager 711 periodically provides the state of all of the entries in MTE 721 to CDB description manager 303.

Figure 8:
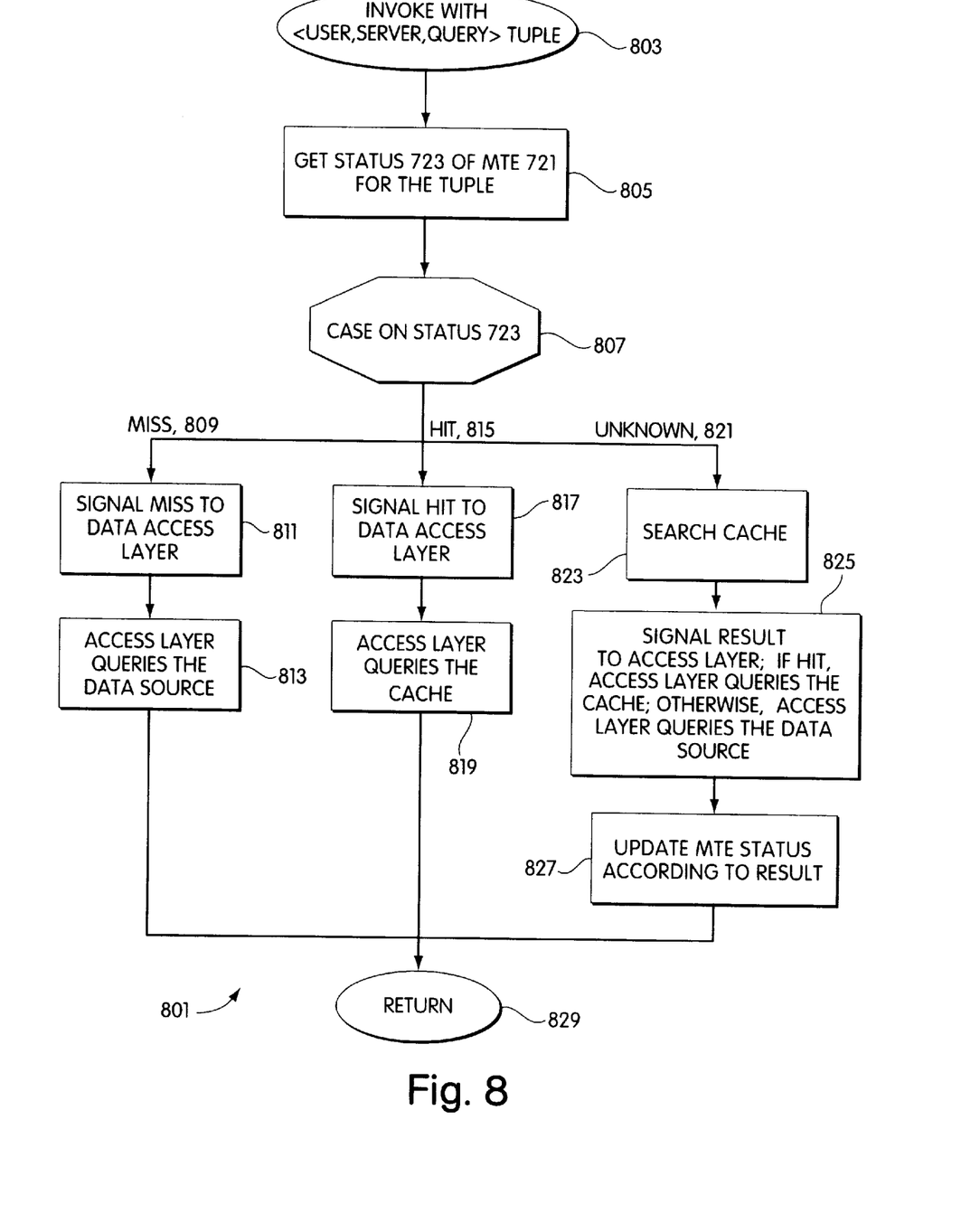
FIG. 8 is a flowchart of the operation of the miss table.

The semantics of miss table 719 for the case when there is an entry in miss table 719 corresponding to tuple <703, 705,707> from the query are shown in overview in flowchart 801 of FIG. 8. The relevant routine of miss table manager 711 is invoked at 803 with the <user,server,query>tuple; at 805, Status 723 for the corresponding MTE 721 is retrieved from miss table 719; at 807, the value of status 703 is used to determine whether miss branch 809, hit branch 815, or unknown branch 821 will be taken. In miss branch 809, the miss is signaled to data access layer 349 at 811 and at 813, the data access layer queries the data source. In hit branch 815, the hit is signaled to data access layer 349 at 817 and at 819, the data access layer queries the cache. In unknown branch 821, the cache is searched for the rowset corresponding to the query at 823; at 825, the results of the search are signaled to the data access layer, which queries the cache or the data source accordingly. At 827, status 723 is updated in the MTE in accordance with the result. The routine returns at 829.

Conclusion

The foregoing Detailed Description has disclosed to those skilled in the art of caching data how a miss table may be used to speed up references to uncached data in a dynamic cache which is not loaded on miss and how such a miss table may be used with a queryable cache in a network server. The Detailed Description has further disclosed the best mode presently known to the inventors of practicing their invention. It will, however, be immediately apparent to those skilled in the art of caching data that many features of the embodiment of the miss table disclosed in the Detailed Description are consequences of the environment provided by the queryable cache for which it has been implemented and that embodiments can be made for other environments which will work according to the principles of the miss table disclosed herein, but will otherwise differ substantially from the embodiment disclosed herein. It is also the case that many different techniques are known in the art for implementing tables and for accelerating the process of locating an entry in a table, and many of these techniques can be used in implementations of miss tables that work according to the principles of the miss table disclosed herein. Moreover, in other embodiments, the miss table may have statuses in addition to the miss status that differ from those of the miss table disclosed herein and different techniques may be used to decide when a table entry is to be reused or how the miss table should be updated when the data in the cache changes.

For all of the foregoing reasons, the Detailed Description is to be regarded as being in all respects exemplary and not restrictive, and the breadth of the invention disclosed here in is to be determined not from the Detailed Description, but rather from the claims as interpreted with the full breadth permitted by the patent laws.

What is claimed is:

1. An improved network server of a type that includes a cache containing a copy of a rowset from a remote location, the network server responding to a rowset specifier specifying the remote location and the rowset therein by providing the copy from the cache when the copy is therein, the network server having the improvement comprising:
   a miss table that relates the rowset specifier to a status indicator, the status indicator being able to indicate at least whether the copy is in the cache, the network server using the miss table prior to applying the rowset specifier to the cache to determine whether the copy is in the cache, and when not, responding to the rowset specifier by fetching the rowset from the remote location.

2. The network server set forth in claim 1 wherein:
   the miss table employs an entry that includes at least the status indicator to relate the rowset specifier to the status indicator; and
   the status indicator is further able to indicate that it is unknown whether the copy is in the cache,
   the network server responding when the status indicator indicates that it is unknown whether the copy is in the cache by searching for the copy in the cache and setting the status indicator in the entry according to whether the copy is in the cache.

3. The improved network server set forth in claim 2 wherein:
   the network server further fetches the copy from the cache when the copy is therein.

4. The improved network server set forth in claim 2 wherein:
   when a copy is added to the cache and the status indicator affected thereby currently indicates that the copy is not in the cache, the network server sets at least that status indicator to indicate unknown.

5. The improved network server set forth in claim 4 wherein:
   the miss table further comprises a plurality of the miss table entries, each entry having an index; and
   when the network server responds to the rowset specifier, the network server hashes the rowset specifier to obtain an index of a miss table entry.

6. The improved network server set forth in any one of claims 1 through 5 wherein:
   the cache and the remote location are queryable; and
   the rowset specifier specifies a query.

7. An improved method of obtaining a rowset stored in a remote data source in response to a rowset specifier that specifies the remote data source and the rowset therein by performing the steps of
   applying the rowset specifier to a local cache to retrieve a copy of the rowset therefrom; and retrieving the rowset from the remote data source only if the copy is not in the local cache, the improved method further comprising the step of:
   prior to the step of applying the rowset specifier to the local cache, applying the rowset specifier to a miss table that relates the rowset specifier to a status indicator indicating at least whether the copy is in the local cache,
   the step of applying the rowset specifier to the local cache being performed only if the status indicator indicates that the copy is in the local cache.

8. The method set forth in claim 7 wherein
   the miss table employs an entry that includes at least the status indicator to relate the rowset specifier to the, status indicator; and
   the status indicator is further capable of indicating that it is unknown whether the copy is in the cache; and
   the method further comprises the step performed when the status indicator indicates that it is unknown whether the copy is in the cache of:

searching for the copy in the cache and setting the status indicator in the entry according to whether the copy is in the cache.

9. The method set forth in claim 8 further comprising the step of:

fetching the copy from the cache when the copy is therein.

10. The method set forth in claim 8 further comprising the step of:

when a copy is added to the cache and the status indicator affected thereby currently indicates that the copy is not in the cache, setting at least that status indicator to indicate unknown.

11. The method set forth in claim 10 wherein the miss table further comprises a plurality of the miss table entries, each entry having an index; and the method further comprises the step of:

hashing the rowset specifier to obtain an index of a miss table entry.

12. The method set forth in any one of claims 7 through 11 wherein:

the cache and the remote location are queryable; and the rowset specifier specifies a query.

13. Apparatus that fetches items of data from a remote location, the apparatus comprising:

a cache that stores copies of the items and provides an item's copy in response to an item specifier for the item;

a miss table that relates an item specifier to a status indicator that indicates at least whether there is a copy of the item specified by the item specifier in the cache; and a dispatcher that responds to the item specifier by presenting the item specifier to the miss table prior to applying the item specifier to the cache and on receiving an indication from the miss table that there is no copy in the cache, fetching the item of data from the remote location.

14. The apparatus set forth in claim 13 wherein the apparatus further comprises:

a miss table manager that modifies the miss table;

the miss table employs an entry that includes at least the status indicator to relate the rowset specifier to the status indicator;

the status indicator may further indicate that it is unknown whether there is a copy of the item; and when the status indicator indicates that it is unknown whether there is a copy of the item, the cache responds to the item specifier and provides an indication whether there is a copy of the item to the miss table manager, the miss table manager updating the miss table in accordance with the indication.

15. The apparatus set forth in claim 14 wherein:

the cache provides a change event notification to the miss table manager when a copy of a data item has been added to the cache; and when the status indicator affected thereby currently indicates that the copy is not in the cache, the miss table manager responds to the change event notification by setting the status indicator to indicate unknown.

16. The apparatus set forth in any one of claims 13 through 15 wherein:

the cache and the remote location are queryable; and the item specifier specifies a query.

* * * * *